US012142097B1

(12) United States Patent
Black et al.

(10) Patent No.: US 12,142,097 B1
(45) Date of Patent: Nov. 12, 2024

(54) SYSTEMS AND METHODS FOR PROVIDING KEY TRANSFERS FOR ROADSIDE ASSISTANCE SERVICES

(71) Applicant: United Services Automobile Association (USAA), San Antonio, TX (US)

(72) Inventors: Robert Lee Black, San Antonio, TX (US); Timothy Blair Chalmers, San Antonio, TX (US); Zachery C. Lake, Aubrey, TX (US); Justin Dax Haslam, San Antonio, TX (US); Matthew Robert Byrd, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 76 days.

(21) Appl. No.: 17/875,774

(22) Filed: Jul. 28, 2022

Related U.S. Application Data

(60) Provisional application No. 63/227,653, filed on Jul. 30, 2021.

(51) Int. Cl.
G07C 9/00 (2020.01)
B60W 40/09 (2012.01)
(52) U.S. Cl.
CPC ......... G07C 9/00309 (2013.01); B60W 40/09 (2013.01); B60W 2540/30 (2013.01)

(58) Field of Classification Search
None
See application file for complete search history.

(56) References Cited

U.S. PATENT DOCUMENTS

2021/0133906 A1* 5/2021 Lota ................. G07B 15/02
2023/0245558 A1* 8/2023 Monegan ............. H04W 4/90

* cited by examiner

Primary Examiner — K. Wong
(74) Attorney, Agent, or Firm — Fletcher Yoder, P.C.

(57) ABSTRACT

The present disclosure is related to a system including a communication component and a processor coupled to the communication component. The processor may collect user input data indicative of skills for providing vehicle towing services from users, receive driving behavior data associated with each user, build a model indicative of an expected location of each user based on the user input data and the driving behavior data, receive a request for a vehicle towing service associated with a vehicle from a computing device, identify a user for performing the vehicle towing service based on the driving behavior data, send a notification to an additional computing device to request a confirmation that the user agrees to perform the vehicle towing service, send a location of the vehicle to the additional computing device, and transfer a digital key to the additional computing device to access the vehicle.

20 Claims, 3 Drawing Sheets

SYSTEMS AND METHODS FOR PROVIDING KEY TRANSFERS FOR ROADSIDE ASSISTANCE SERVICES

CROSS-REFERENCE TO RELATED APPLICATION

The present application claims the benefit of and priority to U.S. Provisional Patent Application Ser. No. 63/227,653, titled "SYSTEMS AND METHODS FOR PROVIDING KEY TRANSFERS FOR ROADSIDE ASSISTANCE SERVICES," which was filed on Jul. 30, 2021, and which is herein incorporated by reference in its entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Roadside assistance includes services assisting a user (e.g., a driver) whose vehicle has certain issues (e.g., mechanical problems, electrical problems, software problems). In some cases, the driver may leave the vehicle unattended and take another vehicle (e.g., a rental car) to a desired destination. In one case, a service provider (e.g., a vehicle towing company) may arrive later to have the vehicle transported to a site (e.g., a car repair shop) for repairing services. In any case, operations or tasks may be coordinated between the driver and the service provider to ensure that the driver may retrieve the vehicle at a later time.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a communication component and a processor coupled to the communication component. The processor may collect user input data from each of a group of users. The user input data may be indicative of one or more skills for providing vehicle towing services. The processor may also receive driving behavior data associated with each of the group of users and build a model indicative of an expected location of each of the group of users based on the user input data and the driving behavior data. The processor may also receive a request for a vehicle towing service associated with a vehicle from a computing device and identify one user for performing the vehicle towing service based on the driving behavior data of each of the group of users. The processor may also send a notification to an additional computing device to request a confirmation that the one user agrees to perform the vehicle towing service. Furthermore, the processor may send a location of the vehicle to the additional computing device and transfer a digital key to the additional computing device for accessing the vehicle.

In another embodiment, a method may include collecting user input data indicative of one or more skills for providing vehicle towing services from each of a group of users, receiving driving behavior data associated with each of the group of users, building a model indicative of an expected location of each of the group of users based on the user input data and the driving behavior data of each of the group of users, receiving a request for a vehicle towing service associated with a vehicle from a computing device, identifying one user for performing the vehicle towing service based on the driving behavior data of each of the group of users, sending a notification to an additional computing device to request a confirmation that the one user agrees to perform the vehicle towing service, sending a location of the vehicle to the additional computing device, and transferring a digital key to the additional computing device for accessing the vehicle.

In yet another embodiment, a non-transitory computer-readable medium comprising computer-executable instructions that, when executed, are configured to cause a processor to perform operations. The operations may include collecting user input data indicative of one or more skills for providing vehicle towing services from each of a group of users, receiving driving behavior data associated with each of the group of users, building a model indicative of an expected location of each of the group of users based on the user input data and the driving behavior data of each of the group of users, receiving a request for a vehicle towing service associated with a vehicle from a computing device, identifying a user for performing the vehicle towing service based on the driving behavior data of each of the group of users, sending a notification to request a confirmation that the user agrees to perform the vehicle towing service to an additional computing device, sending a location of the vehicle to the additional computing device, and transferring a digital key to the additional computing device for accessing the vehicle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
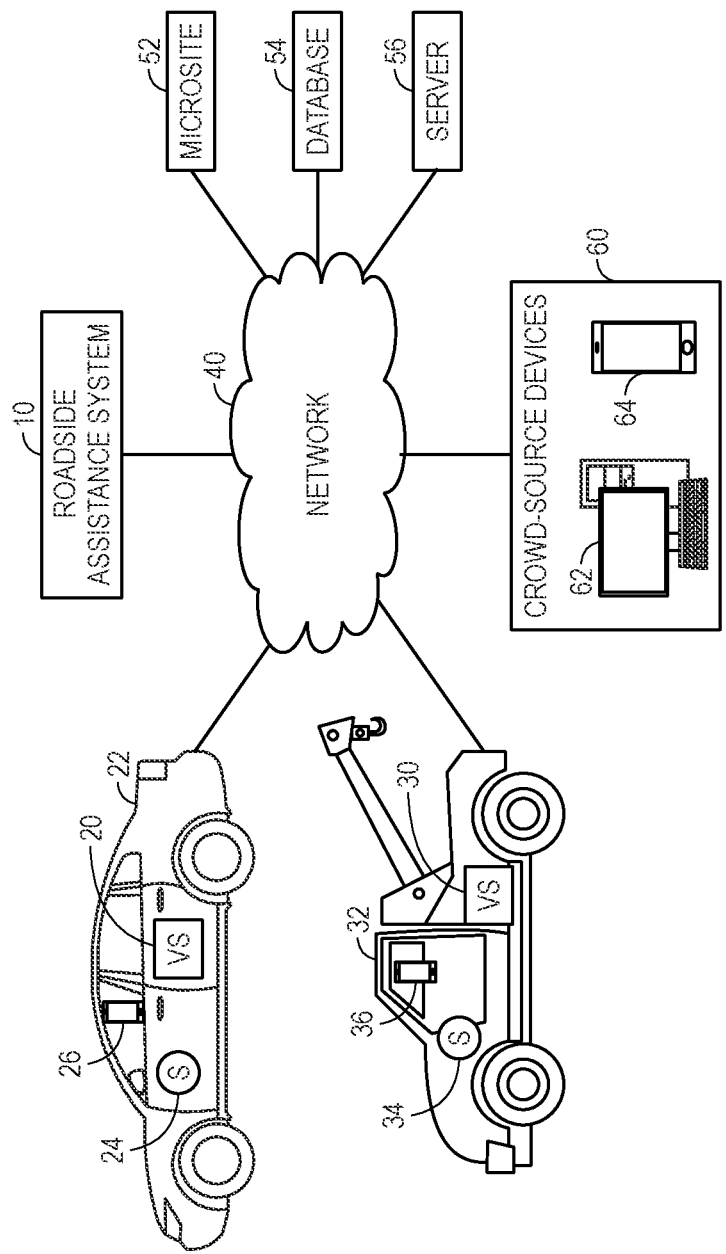
FIG. 1 illustrates a block diagram of a system for using crowdsourcing to facilitate roadside assistance via a roadside assistance system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Example methods, devices, systems, and applications are described herein. It should be understood that the word "example" is used here to mean serving as an example, instance, or illustration. Any embodiment or feature described herein as being an example is not necessarily to be constructed as advantageous over other embodiments or features unless stated as such. Different embodiments can be utilized and changes can be made without departing from the scope of the subject matter presented herein.

Further, any enumeration of elements, blocks, or process steps in this specification is for purpose of clarity. Therefore, such enumeration should not be interpreted to imply that these elements, blocks, or process steps adhere to a particular arrangement or are carried out in a particular order.

Additionally, when introducing elements of various embodiments, the articles "a," "an," "the," and "said" are intended to mean that there are one or more of the elements. The terms "comprising," "including," and "having" are intended to be inclusive and mean that there may be additional elements other than the listed elements.

When operating a vehicle during a road trip, a driver may encounter unexpected situations. For example, the vehicle may have certain issues, such as mechanical faults, electrical faults, software issues, and the like. Such issues may leave the driver stranded on the road. In some cases, the driver may contact an insurance provider or a service provider that provides roadside assistance services for the user. In some embodiments, the roadside assistance services may include a key transfer service to provide a vehicle to an automobile service provider (e.g., a vehicle towing company) for the stranded vehicle. In this way, the driver may take another vehicle (e.g., a ride share) and continue to proceed to a desired destination while leaving the problematic vehicle at a particular location. An automobile service provider may arrive later to have the vehicle transported to a site (e.g., a car repair shop) for repairing services. In such cases, a roadside assistance system may coordinate the transfer of a key (e.g., digital or physical key) to the automobile service provider in a secured and/or efficient manner.

As crowdsourcing becomes more prevalent in various service sectors using shared data from different users, the insurance provider or other service providers may utilize the crowdsourcing to improve a roadside assistance service to reduce the waiting time for the driver stranded on the road. In one embodiment, after receiving a request for roadside assistance (e.g., a key transfer) from the driver, the roadside assistance system may identify users (e.g., tow truck drivers) through crowdsourcing requests (e.g., broadcast request via an application, website, text message) that may provide the requested roadside assistance within a suitable time. For example, the roadside assistance system may determine that the suitable user is within a threshold distance to a location of a stalled vehicle (e.g., based on vehicle location data), the requesting driver (e.g., based on driver computing device location data), and the like. The roadside assistance system may guide the suitable user to the location of the stalled vehicle to have the vehicle transported to a site (e.g., a car repair shop) for repair services. Upon arriving within a threshold distance of the stalled vehicle, the roadside assistance system may transmit a digital key that may allow the user to access a physical key stored in a mechanical lock box, access the vehicle by scanning the digital key, or the like. In some embodiments, while the driver is stranded with the vehicle, a computing system (e.g., mobile device) may broadcast a signal via Wi-Fi or Bluetooth to nearby computing devices (e.g., mobile devices) to obtain a ride-share service for the stranded driver to secure a ride to a desired destination. In such ways described above, the driver may reach a desired location without waiting for a service provider to secure the stranded vehicle.

As used herein, crowdsourcing may refer to a sourcing model in which individuals or organizations obtain goods or services (e.g., ideas, voting, micro-tasks, or finances) from a relatively large, open and evolving group of users/participants. Crowdsourcing may use a network (e.g., the internet) to attract and divide work between users/participants to achieve a cumulative result.

Embodiments of the present disclosure are generally directed toward a roadside assistance system that assists a driver in securing a transportation of a stalled vehicle to an automobile service provider (e.g., an automobile repair shop). The roadside assistance system utilizes crowdsourcing to collect user input (e.g., abilities for providing roadside assistance such as vehicle towing services) and monitors user behavior (e.g., driving behavior). Based on the collected user input and monitored user behavior, the roadside assistance system may builds a machine learning model stored in a database. When receiving a request for roadside assistance (e.g., towing the stalled vehicle to the automobile repair shop) from the driver, the roadside assistance system may identify, using the machine learning model stored in a database, a list of users (e.g., tow truck drivers) who may provide the requested roadside assistance. Based on the list of user and their location data with respect to a location of the stalled vehicle of the requesting driver, the roadside assistance system may identify a suitable user located within a threshold distance of the location of the stalled vehicle.

Furthermore, the roadside assistance system may transfer a key (e.g., a digital key) to a computing device associated with the identified user and guide the user to the location of the stalled vehicle to provide the requested roadside assistance to the requesting driver. In some embodiments, the roadside assistance system may use a variety of key transfer methods to send a digital key to another computing device associated with the user providing the roadside service. The digital key may include a digital code, a quick response (QR) code, or any other suitable machine-readable code that may be used to open a mechanical lock box secured to the stalled vehicle, activate a communication-enabled device (e.g., Bluetooth) on the stalled vehicle to unlock the stalled vehicle, transfer identification information of the suitable user to a vehicle system of the stalled vehicle to allow the user access to the vehicle under certain conditions, and the like. In some embodiments, the roadside assistance system may employ a multi-factor authentication that may involve sending a notification to the vehicle system when the suitable user is within a threshold distance of the stalled vehicle, such that the notification may cause the vehicle system to send a scannable code to the computing device of the user providing service to allow the user access to the stalled vehicle.

In addition, the roadside assistance system may provide other suitable key transfer services. For example, the roadside assistance system may dispatch a mobile key making device (e.g., a key cutting drone) to the location of the stalled vehicle. The mobile key making device may make a replacement key, such that the suitable user arriving at the location of the stalled vehicle may utilize the replacement key to unlock the stalled vehicle and tow the stalled vehicle (e.g., an automobile repair shop) for repair.

Additional details with regard to the roadside assistance system, including collecting user input using crowdsourcing, monitoring user behavior, building a machine learning model, identifying a list of users based on the machine learning model and user's location data, and determining a suitable user for providing roadside assistance to a driver stranded on a road, will be discussed in detail below with reference to FIGS. 1-3.

With the forgoing in mind, turning now to the figures, FIG. 1 illustrates a block diagram of a system for using crowdsourcing to facilitate roadside assistance via a roadside assistance system 10. The roadside assistance system 10 may aggregate and analyze user data (e.g., customer driver data, tow truck driver data) from a variety of data sources to assist the roadside assistance system 10 to provide roadside assistance requested by customer drivers. The user data may include user input data (e.g., abilities for providing roadside assistance such as vehicle towing services), user behavior data (e.g., driving behavior of tow truck drivers and/or customer drivers), and other suitable data such as historical roadside assistance record data (e.g., vehicle towing records of the tow truck drivers). In some cases, the user input data may also include information regarding the user's limits (e.g., limited vehicle towing ranges or limited types of vehicles that can be towed). The roadside assistance system 10 may utilize the user data to build a model (e.g., a machine learning model) to facilitate roadside assistance for the customer drivers who may experience issues with their vehicles during road trips.

In certain embodiments, the roadside assistance system 10 may be communicatively coupled to a network 40, which may include collections of computing systems, the Internet, an Intranet system, or the like. The network 40 may facilitate communication between the roadside assistance system 10 and the variety of data sources. For instance, the network 40 may be communicatively coupled to a first vehicle system 20 on a vehicle 22 of a customer driver and a second vehicle system 30 on a tow truck 32 of a tow truck driver. Although the illustrated embodiment includes two vehicle systems on two vehicles (e.g., the vehicle 22 and the tow truck 32), it should be noted that, in other embodiments, the network 40 may be communicatively coupled to more vehicle systems on more vehicles.

In certain embodiments, the vehicle systems may monitor user driving behavior associated with operations of the corresponding vehicles (e.g., customer vehicles, tow trucks). In one embodiment, the vehicle system 20 may monitor a location of the vehicle 22 that may be stalled due to a mechanical problem, an electrical problem, a software problem, or a combination thereof. The vehicle system 20 may be communicatively coupled to one or more sensors 24 within the vehicle 22 to acquire data regarding the customer driver, the passenger(s), the operations of the vehicle 22, and so forth. The one or more sensors 24 may include any suitable sensor, such as infrared sensor(s), pressure sensor(s), weight sensor(s), or a combination thereof. By way of example, the vehicle system 20 may be communicatively coupled to a global positioning system (GPS) of the vehicle 22, an odometer of the vehicle 22, and other sensors that may provide information regarding the customer driving behavior and/or operation (e.g., location) of the vehicle 22. In addition, the vehicle system 20 may be communicatively coupled to other computing devices such as mobile devices 26 (e.g., mobile phones, tablet devices, and the like) to monitor the usage of the mobile devices 26 during the operation of the vehicle 22. The usage of the mobile devices 26 may provide additional information regarding the customer driving behavior (e.g., leaving the stalled vehicle, taking a rental car).

In another embodiment, the vehicle system 30 may monitor a location of the tow truck 32, frequency of use of the tow truck 32, expected times at which the tow truck 32 being used, expected routes of the tow truck 32, expected types of towed vehicles, and the like. The vehicle system 30 may be communicatively coupled to one or more sensors 34 within the tow truck 32 to acquire data regarding the tow truck driver (e.g., driving behavior), the passenger(s) (e.g., assistants with the tow truck driver), the operations of the tow truck 32 (e.g., towing various types of vehicles), and so forth. The one or more sensors 34 may include any suitable sensor, such as cameras, location sensor(s), infrared sensor(s), pressure sensor(s), weight sensor(s), or a combination thereof. By way of example, the vehicle system 30 may be communicatively coupled to a global positioning system (GPS) of the tow truck 32, an odometer of the tow truck 32, and other sensors that may provide information regarding the tow truck driver driving behavior and/or operation (e.g., location) of the tow truck 32. In addition, the vehicle system 30 may be communicatively coupled to other computing devices such as mobile devices 36 (e.g., mobile phones, tablet devices, radio devices, and the like) to monitor the usage of the mobile devices 36 during the operation of the tow truck 32. The usage of the mobile devices 36 may provide additional information regarding the tow truck driver driving behavior (e.g., switching from the tow truck 32 to another tow truck).

The roadside assistance system 10 may receive the user behavior data collected by the vehicle systems 20 and 30, and/or the one or more sensors 24 and 34, and/or the mobile devices 26 and 36. The roadside assistance system 10 may store the user behavior data in one or more databases 54. The user behavior data may be used to build the machine learning model to facilitate the roadside assistance services.

It should be noted that the vehicle system (e.g., the vehicle system 20) on the vehicle 22 of the customer driver may be similar to or different from the vehicle system (e.g., the vehicle system 30) on the tow truck 32 of the tow truck driver. For example, the vehicle system 30 may receive an image from a camera and determine a type of a vehicle towed by the tow truck 32 based on the received image.

In some embodiments, the network 40 may be communicatively coupled to a microsite 52. As described previously, the roadside assistance system 10 may utilize crowdsourcing to collect user input (e.g., abilities for providing roadside assistance such as vehicle towing services). The user input may be acquired via the microsite 52 (e.g., hosted by a server of the insurance provider) that allows users (e.g., tow truck drivers) to sign up to help other user (e.g., customer drivers) seeking roadside assistance. As used herein, microsite 52 may refer to an individual web page or a small cluster of pages that may function as a discrete entity within an existing website or to complement an offline activity. A microsite's main landing page may have its own domain or subdomain name. During a sign-up process on the microsite 52, a user may provide abilities (e.g., vehicle towing services in certain time range(s) and/or in certain area(s)) and/or skills (e.g., towing certain types of vehicles). In some embodiments, the user input may be acquired by other methods. For example, the user may receive (e.g., via an email, a text message, or a phone call) a survey or questionnaire for collecting user input regarding the abilities and/or skills listed above. In some embodiments, the insurance provider may encourage the users to participate in the sign-up process or to respond to the other query actions by indicating that users may receive a compensation if the user perform a vehicle towing service to a requesting driver.

In some embodiments, the network 40 may also be communicatively coupled to one or more databases 54, which may store the user data, such as abilities for providing roadside assistance (e.g., vehicle towing services), the user's driving behavior data, and other data that may be suitable for facilitating the roadside assistance for stranded drivers during their road trips. As described above, the user data may be acquired from different data sources (e.g., the server of the insurance provider, the vehicle systems, the various sensors, the mobile devices, the crowd-source devices) using different methods (e.g., via a microsite, an email, a text message, or a phone call). The acquired user data may include different data format and/or data structures, which may inhibit data queries to find a group of suitable users (e.g., tow truck drivers) that may provide the vehicle towing service in respond to a request for the vehicle towing service from the requesting driver.

In some embodiments, the acquired user data may be re-organized or re-formatted into a unified data format or a data structure. For example, the acquired user data may be categorized and formatted into individual vectors (e.g., feature vectors) for each user based on multiple dimensions of the user data, such as name, abilities for providing roadside assistance, skills for providing roadside assistance, frequency of use of a tow truck, expected times at which the tow truck is being used, expected routes of the tow truck, expected types of towed vehicles, and so on. As such, finding the group of suitable users in the database may include identifying a group of vectors based on quantifying ability, skill, and driving behavior similarities of users (e.g., by computing distances between vectors). Based on the created vectors, certain computations (e.g., vector distance calculation, nearest neighbor search) may be performed to identify a group of users that may provide vehicle towing services in response to requests for roadside assistance.

In certain embodiments, after receiving the user data from various data sources, the roadside assistance system 10 may determine identification information (e.g., a number, a code, or a parameter) associated with each user and create a digital ledger (e.g., a block chain) to track the user data received for each user. Each ledger may include a header containing the identification and a payload that include other data entries (e.g., abilities, skills, driving behavior) received by the roadside system 10. The ledgers may be dynamic ledgers that may grow when receiving additional user data (e.g., new skills for vehicle towing services). The ledgers may recede in size when the data is deleted or modified. In some embodiments, the payload of the ledger may be structured according to a particular order, such that different types of data are stored in different positions or offsets with respect to the header. For example, skills related to towing small vehicles (e.g., passenger cars) may be stored in one specific position and abilities related to towing large vehicle (e.g., trucks) may be stored in another specific position. In this way, the roadside system 10 and other computing systems may request a collection of data from the database 54 for database queries more efficiently (e.g. using less searching/querying time, reducing computing time and/or power). For example, the roadside assistance system may retrieve payload data from the same offset position in multiple ledgers and perform data analysis based on the retrieved data.

In some embodiments, the network 40 may also be communicatively coupled to one or more servers 56. The one or more servers 56 may include computing servers (e.g., hosting and/or support at least part of the roadside assistance system 10), storage servers (e.g., hosting and/or support the one or more databases 54), particular server(s) dedicated to specific task(s) (e.g., communicating with crowd-source devices), and the like.

In some embodiments, the network 40 may also be communicatively coupled to crowd-source devices 60. The crowd-source devices 60 may include a variety of computing devices associated with the users, such as desktop computers 62, mobile phones 64, tablets, or any suitable devices that can be used for crowdsourcing. For example, the crowd-source devices 60 may have crowdsourcing software linked to the microsite 52 or other crowdsourcing web pages and/or microsites that the microsite 52 may access.

Although the system described in FIG. 1 is described in a particular configuration, it should be noted that the system may be implemented in any suitable configuration and is not limited to the configuration presented herein. For example, although the vehicle systems (e.g., vehicle system 20, vehicle system 30), the microsite 52, the database 54, the one or more servers 56, or the one or more crowd-source devices 60 are described as being communicatively coupled to the roadside assistance system 10 via the network 40, in other embodiments, at least some of the components listed above may be communicatively coupled directly to the roadside assistance system 10.

Figure 2:
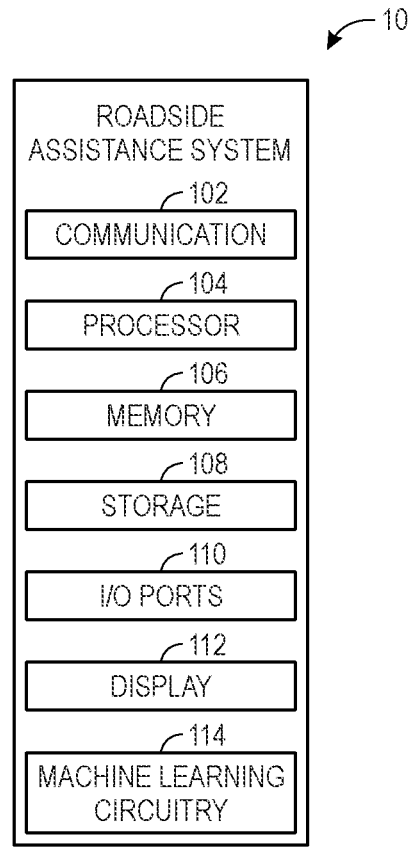
FIG. 2 illustrates a block diagram of the roadside assistance system of FIG. 1, in accordance with embodiments described herein.

FIG. 2 illustrates a block diagram of the roadside assistance system 10 of FIG. 1. The roadside assistance system 10 may include various types of components that may assist the roadside assistance system 10 in performing various types of computer tasks and operations. For example, the roadside assistance system 10 may include a communication component 102, a processor 104, a memory 106, a storage 108, input/output (I/O) ports 110, a display 1122, a machine learning circuitry 114, and the like.

The communication component 102 may be a wireless or wired communication component that may facilitate communication between the roadside assistance system 10 and the variety of data sources via the network 40. For example, the communication component 102 may allow the roadside assistance system 10 to obtain the user data from the variety of data sources, such as the one or more databases 54 (e.g., insurance record database of customer drivers, driving behavior database of tow truck drivers, input database of the tow truck drivers), user devices (e.g., smart phones, desktop computers, laptops, tablets), vehicle systems, and the like. The communication component 102 may receive/send notifications (e.g., requests for providing vehicle towing services to the customer drivers) from/to the user devices. The communication component 102 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The processor 104 may process instructions for execution within the roadside assistance system 10. The processor 104 may include single-threaded processor(s), multi-threaded processor(s), or both. The processor 104 may process instructions stored in the memory 106 and/or the storage 108. The processor 104 may also include hardware-based processor(s) each including one or more cores. The processor 104 may include general purpose processor(s), special purpose processor(s), or both. The processor 104 may be communicatively coupled to other internal components (such as the communication component 102, the storage 108, the I/O ports 100, and the display 112).

The memory 106 and the storage 108 may be any suitable articles of manufacture that can serve as media to store processor-executable code, data, or the like. These articles of manufacture may represent computer-readable media (e.g., any suitable form of memory or storage) that may store the processor-executable code used by the processor 104 to perform the presently disclosed techniques. As used herein, applications may include any suitable computer software or program that may be installed onto the roadside assistance system 10 and executed by the processor 104. The memory 106 and the storage 108 may represent non-transitory computer-readable media (e.g., any suitable form of memory or storage) that may store the processor-executable code used by the processor 104 to perform various techniques described herein. It should be noted that non-transitory merely indicates that the media is tangible and not a signal.

The I/O ports 110 may be interfaces that may couple to other peripheral components such as input devices (e.g., keyboard, mouse), sensors, input/output (I/O) modules, and the like. The display 112 may operate as a human machine interface (HMI) to depict visualizations associated with software or executable code being processed by the processor 104. In one embodiment, the display 112 may be a touch display capable of receiving inputs from an operator of the roadside assistance system 10. The display 112 may be any suitable type of display, such as a liquid crystal display (LCD), a plasma display, or an organic light emitting diode (OLED) display. Additionally, in one embodiment, the display 112 may be provided in conjunction with a touch-sensitive mechanism (e.g., a touch screen) that may function as part of a control interface for the roadside assistance system 10.

In certain embodiments, the roadside assistance system 10 may be trained (e.g., via machine learning) to improve services associated with the roadside assistance. As mentioned previously, the roadside assistance system 10 may utilize the user data to build a machine learning model to facilitate roadside assistance for customer drivers who may experience issues with their vehicles during road trips. For example, training data, such as historical roadside assistance record data (e.g., vehicle towing service records), user input data (e.g., abilities and/or skills for providing the vehicle towing service), user behavior data (e.g., driving behavior of the tow truck drivers), or a combination thereof, may be used as input data to train the roadside assistance system 10 to build the machine learning model. A training process may use one or more machine learning algorithms, such as supervised learning algorithms (e.g., classification algorithm, regression algorithm), unsupervised learning algorithms (e.g., when particular output types are not known), or a combination thereof. After training with the machine learning, the roadside assistance system 10 may have improved parameters (e.g., monitoring, analysis, and/or decision-making parameter(s)) and/or model(s) (e.g., simulation model, optimization model, predictive model, forecast model). For example, the roadside assistance system 10 may use the machine learning model to make predictions or decisions with improved accuracy regarding which users may be willing to provide a requested roadside assistance (e.g., a towing service) without being explicitly programmed to perform the requested roadside assistance.

The machine learning algorithms may be implemented using machine learning circuitry 114 or software that may access the training data stored in the database 54. Depending on the inferences, the machine learning circuitry 114 or the software may implement different forms of machine learning. In some embodiments, a supervised machine learning may be implemented. In some embodiments, an unsupervised machine learning may be implemented. As used herein, machine learning may refer to algorithms and statistical models that the roadside assistance system 10 uses to perform a specific task with or without using explicit instructions. For example, a machine learning process may generate a mathematical model (e.g., the machine learning model) based on a sample of the clean data, known as "training data," to make predictions or decisions without being explicitly programmed to perform the task.

Additionally, the roadside assistance system 10 may include other suitable components (e.g., a network controller, a power supply, or a battery). It should be noted that the components described above with regard to the roadside assistance system 10 are exemplary components, and the roadside assistance system 10 may include additional or fewer components as shown.

The machine learning model described above may be utilized by the roadside assistance system 10 to identify a group of users that may provide a vehicle towing service requested by a customer driver and determine a suitable user for performing the requested vehicle towing service. Additional details with regard to identifying the group of users and determining the suitable user for providing the requested vehicle towing service will be discussed in detail below with reference to FIG. 3.

Figure 3:
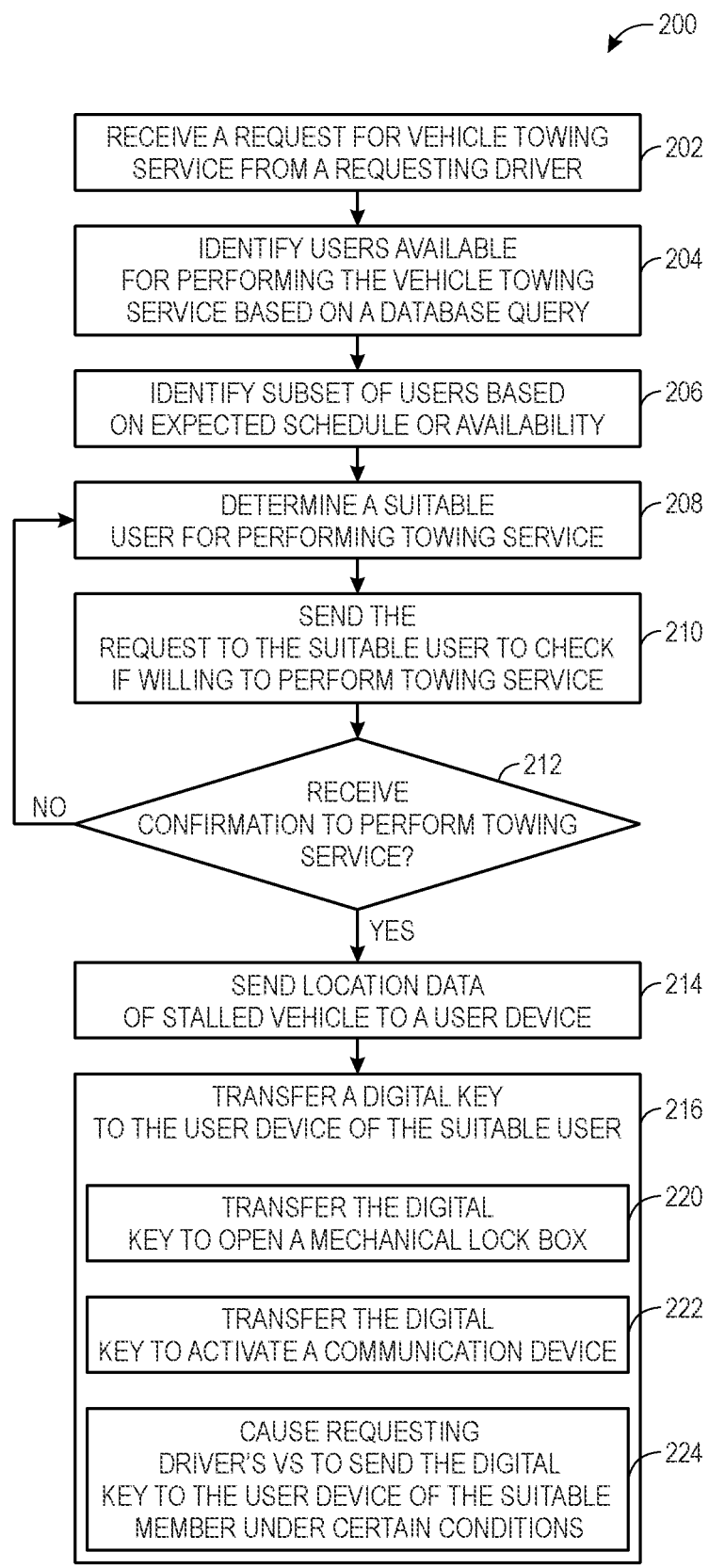
FIG. 3 illustrates a flow diagram of an example method for using crowdsourcing to provide secure key transfer services, in accordance with embodiments described herein.

With the preceding in mind, FIG. 3 illustrates a flow diagram of an example method for using crowdsourcing to provide secure key transfer services. Although the example method 200 described in FIG. 3 is described in a particular order, it should be noted that the example method 200 may be performed in any suitable order and is not limited to the order presented herein. It should also be noted that although each processing block is described below in the example method 200 as being performed by the roadside assistance system, other suitable computing system(s) may perform at least one of the process blocks described herein.

Referring to FIG. 3, at process block 202, the roadside assistance system 10 may receive a request for a vehicle towing service from a requesting driver. The requesting driver may send the request via a mobile device (e.g., the mobile devices 26). The request may include a current location of the requesting driver, as determined based on location data received from a location sensor, vehicle information related to the vehicle (e.g., the vehicle 22) that the requesting driver operates, a type of the vehicle, a desired time or time range that the requesting driver expects for the towing service to arrive, and the like. In some embodiments, the received request may include an identification (ID) of the requesting driver. For example, the ID may be used by the roadside assistance system 10 to locate an insurance policy associated with the requesting driver to verify the identification of the requesting driver. In some embodiments, the roadside assistance system 10 may use the ID to access a vehicle system (e.g., the vehicle system 20) on the vehicle of the requesting driver to acquire/confirm the location information of the requesting driver.

At process block 204, the roadside assistance system 10 may identify users that may be available for performing the vehicle towing service based on a database query. For example, the roadside assistance system 10 may send a query request to the one or more databases 54 to identify a set of users (e.g., tow truck drivers) that have signed up to provide the vehicle towing service. As described previously, the user data stored in the one or more databases 54 may be re-organized or re-formatted into a unified data format or a data structure, which may facilitate the database query with improved efficiency, reduced querying time, and/or reduced cost.

After a set of users are identified, at process block 206, the roadside assistance system 10 may identify a subset of users (e.g., tow truck drivers) based on expected schedules, availabilities, or other relevant information of the users. For example, the roadside assistance system 10 may determine, based on other information in the user data associated with each of the set of users identified to determine the subset of users that may provide the vehicle towing service within certain amount of time (e.g., based on the desired time or time range of the requesting driver). Such information may include, but is not limited to, a location of a user, expected experience of use of a tow truck by the user, expected times at which the tow truck may be used by the user, expected routes of the tow truck, expected types of towed vehicles, and the like. The expected characteristics of the users may be determined based on historical data and indications that the user's characteristics or behavior for a specific property is greater than some threshold percentage of overall use. In one embodiment, the roadside assistance system 10 may determine (e.g., based on current locations via the vehicle systems or other mobile devices of the users) that certain users among the set of users identified at process block 204 may be in further distances from the location of the requesting driver that other users among the set of users. In another embodiment, the roadside assistance system 10 may determine (e.g., based on images acquired by cameras of the vehicle systems on the tow trucks) that certain users among the set of users are in processes of performing other vehicle towing services and may not perform the requested vehicle towing service within certain amount of time (e.g., based on the desired time or time range of the requesting driver). As such, those users described above may be excluded from the subset of users.

In certain embodiments, the machine learning model described previously may be used to facilitate identifying the subset of users based on expected schedules, availabilities, or other relevant information of the users. In some cases, the roadside assistance system 10 may use additional data as input to the machine learning model to improve an accuracy of an identification process (e.g., identifying the subset of users) described above. The roadside assistance system 10 may use the additional data and other training data (e.g., monitored user behavior) to better identify users that may be willing and/or capable of performing a roadside assistance (e.g., car towing) within a desired time range without being explicitly programmed to perform the request roadside assistance. For example, the roadside assistance system 10 may access additional data sources to obtain the additional data, such as current and/or historical traffic data, weather data, road construction data, other suitable data, or a combination thereof. The additional data may be utilized by various simulation models, forecast models, prediction models included in the machine learning model to improve the accuracy of identifying the subset of users. For example, certain users of the set of users being identified at process block 204 may have certain expected driving routes that are scheduled for repair/construction or are going to experience certain weather conditions (e.g., storm, flooding). As such, those users may be excluded from the set of users.

At process block 208, the roadside assistance system 10 may determine a suitable user for performing the vehicle towing service. In some embodiments, the roadside assistance system 10 may utilize the machine learning model to determine the suitable user from the subset of users identified at the process block 206 based on a current location, driving behavior (e.g., frequent driving routes), and other relevant information of each user in the subset of users. That is, the machine learning model may provide insight into expected locations of certain users at various times to identify users that may be within a threshold amount of distance from the driver requesting the service within a threshold amount of time. The machine learning model may generate a ranking number or a score for each user in the subset of users based on the criteria described above. For example, a user having highest ranking number or score may be determined as the most suitable user for the requested roadside service due to his expected proximity to the driver and the expected time in which the user may be able to provide the service relative to other users. In some embodiments, additional information may be used to determine the ranking number of the score. For example, the roadside assistance system 10 may use feedback information to vet the users providing vehicle towing services. For example, the roadside assistance system 10 may use previous ratings from other vehicle towing services performed in the past (e.g., feedbacks from a requesting driver to confirm that a promised vehicle towing service has been performed on time, or the stalled vehicle of the requesting driver has been towed to a desired place (e.g., specified by the requesting driver) for repair) to determine the suitable user.

At process block 210, the roadside assistance system 10 may send the request for the vehicle towing service to the suitable user to check if the suitable user is willing to perform the requested vehicle towing service. The request may include asking for a confirmation that the suitable user can arrive at a location of the stalled vehicle and provide the requested towing service within the desired time or time range that the requesting driver expects. The request may be sent to a user device (e.g., one of the mobile devices 36) of the suitable user via a push notification, a text message, a phone call, an email, and the like. The request may cause the user device to automatically open an application or present a visualization indicative of the notification to ensure that the user is notified of the notification, such that the driver may receive tow services in a timely fashion.

At process block 212, the roadside assistance system 10 may determine whether a confirmation to perform the requested towing service is received. If the suitable user sends the confirmation (e.g., via the user's device) indicating the requested towing service is expected within the desired time or time range, at process block 214, the roadside assistance system 10 may send location data of the stalled vehicle to the user device. For example, the location data may be sent to one of the mobile devices 36 (e.g., mobile phones, tablet devices, radio devices, and the like) of the suitable user via a text message (e.g., an address of the location of the stalled vehicle, a graphic message (e.g., a map indicating the location of the stalled vehicle), a link (e.g., a link when clicking on it may automatically (e.g., regardless of the application being open, closed, in sleep mode) launch a map application showing a suitable route to the location of the stalled vehicle), a phone call, an email, and the like.

If, at process block 212, the roadside assistance system 10 receives a confirmation from the suitable user indicating that the requested towing service cannot be performed within the desired time or time range, the roadside assistance system 10 may return to the process block 208 to determine a next suitable user for performing the requested towing. For example, the roadside assistance system 10 may select a user in the subset of users with lower ranking number or score than the previously determined suitable user. At process block 210, a new request is sent to the next suitable user to check if willing to perform the requested towing service.

After sending the location data of the stalled vehicle to the suitable user for performing the requested towing service, at process block 216, the roadside assistance system 10 may transfer a digital key to the user device of the suitable user. The roadside assistance system 10 may use a variety of key transfer methods to secure a digital key transfer. In some embodiments, a mechanical lock box may be secured to the stalled vehicle (e.g., coupled to a vehicle lock system). The mechanical lock box may communicate with the roadside assistance system 10 (e.g., via the vehicle system 20 or other suitable devices). As such, the mechanical lock box may include similar components as described as part of the roadside assistance system 10 along with an actuator or motor to open and close a mechanical lock feature. At process block 220, the roadside assistance system 10 may transfer or send the digital key (e.g., a digital code, image data such as quick response (QR) code, or the like) to the mechanical lock box, which the mechanical lock box may authenticate and use to cause the actuator to open the lock box, thereby providing access to a physical key that may be used to open the vehicle.

In some embodiments, the roadside assistance system 10 may utilize wireless key sharing techniques to provide the digital key to the user device of the identified user. At process block 222, the roadside assistance system 10 may transfer the digital key to the user device, such that the digital key may activate a communication device of the vehicle 22 that may cause the vehicle system 20 to provide access to the vehicle 22. For example, the roadside assistance system 10 may transfer the digital key to a mobile device (e.g., one of the mobile devices 36, such as a mobile phone, a tablet device, or a radio device) of the suitable user. The mobile device may send a communication signal to the stalled vehicle (e.g., via the vehicle system 20), which may send a communication signal to activate the communication device (e.g., Bluetooth) on the stalled vehicle. The communication device, when activated, may unlock the stalled vehicle (e.g., via the mechanical lock box and/or the vehicle lock system communicatively coupled to the communication device).

In some embodiments, to ensure that the suitable user (e.g., the tow truck driver) is authorized to access the stalled vehicle of the requesting driver, the roadside assistance system 10 may use other methods to transfer the digital key to the suitable user. For example, the roadside assistance system 10 may send the digital key and certain identification information of the suitable user (e.g., name, date of birth, driver license number, employer name, employment identification number, biometric information such as fingerprint, facial image, voice signature) to a vehicle system (e.g., the vehicle system 20) of the stalled vehicle. At process block 224, the roadside assistance system 10 may cause the vehicle system of the stalled vehicle to send (e.g., via the communication component 102) the digital key to the user device of suitable user under certain conditions. Such conditions may include requesting that the suitable user provides certain identification data (e.g., name, date of birth, driver license number, employer name, employment identification number, and biometric data). The vehicle system may verify an identification of the suitable user based on a comparison between the identification information of the suitable user received from the roadside assistance system 10 and the received identification data from the suitable user. The comparison may utilize various technologies and/or algorithms, such as image recognition, voice recognition, and the like.

In some embodiments, a multi-factor authentication may be used when the suitable user reaches a location that is within a proximity (e.g., based on a pre-defined distance) of the stalled vehicle of the requesting driver. For example, the roadside assistance system 10 may send a notification to the vehicle system (e.g., the vehicle system 20) of the stalled vehicle indicating that the suitable user is within the pre-defined distance (e.g., 50 meters, 100 meters, or 500 meters) to the stalled vehicle. The notification may include authentication information of the suitable user, such as an identification number of the vehicle system (e.g., the vehicle system 30) on the tow truck (e.g., the tow truck 32) of the suitable user. In response to receiving the notification, the vehicle system of the stalled vehicle may send a code (e.g., a digital code, a QR code) to the vehicle system on the tow truck and/or the mobile devices (e.g. the mobile devices 36) of the suitable user. The code may be scannable by the vehicle system of the stalled vehicle or other suitable device (e.g., a digital code scanner, a QR scanner) to provide access to the stalled vehicle. The suitable user may scan the code when arriving at the location of the stalled vehicle.

In certain embodiments, the roadside assistance system 10 may monitor the location data of the suitable user and automatically unlock the stalled vehicle when the suitable user enters a pre-defined unlock zone (e.g., a circle with 5 meters radius centered at the stalled vehicle). The roadside assistance system 10 may utilize the mechanical lock box and/or the communication devices described above to automatically unlock the stalled vehicle or provide a key to access the vehicle.

Additionally or alternatively, the roadside assistance system 10 may provide other suitable key transfer services. In certain embodiments, after receiving the request for the vehicle towing service or a request for a replacement key from the requesting driver, the roadside assistance system 10 may dispatch a mobile key making device (e.g., a key cutting drone) to the location of the stalled vehicle. The mobile key making device may make a replacement key such that the requesting driver or the suitable user arriving at the location of the stalled vehicle may utilize the replacement key to unlock the stalled vehicle.

The technologies described in the disclosed embodiments include a roadside assistance system assisting a driver in securing a transportation of a stalled vehicle to an automobile service provider. The roadside assistance system may utilize crowdsourcing to collect user input data (e.g., abilities for providing vehicle towing services) and monitor user behavior (e.g., driving behavior). Based on the collected user input and monitored user behavior, the roadside assistance system may build a machine learning model stored in a database such that, when receiving a request for a vehicle towing service from the driver, the roadside assistance system may utilize the machine learning model to identify a list of users (e.g., tow truck drivers) who may provide the vehicle towing service. Based on the list of users and their location data with respect to a location of the stalled vehicle, the roadside assistance system may determine a suitable user who may perform the vehicle towing service within a desired time or time range.

Furthermore, the roadside assistance system may transfer a digital key to the suitable user and guide the suitable user to the location of the stalled vehicle to provide the vehicle towing service. The roadside assistance system 10 may use a variety of key transfer methods to secure a digital key transfer, such as transferring the digital key to open a mechanical lock box secured to the stalled vehicle, transferring the digital key to activate a communication device on the stalled vehicle to unlock the stalled vehicle, transferring the digital key and certain identification information of the suitable user to a vehicle system of the stalled vehicle and causing the vehicle system to send the digital key to the suitable user under certain conditions, and using a multifactor authentication including sending a notification to the vehicle system when the suitable user is within a pre-defined distance to the stalled vehicle and causing the vehicle system to send a code that may provide the suitable user an access to the stalled vehicle.

Additionally, the roadside assistance system may provide other suitable key transfer services such as dispatching a mobile key making device to the location of the stalled vehicle. The mobile key making device may make a replacement key that may provide an access to the stalled vehicle for the suitable user arriving at the location of the stalled vehicle.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a communication component; and
a processor configured to couple to the communication component, wherein the processor is configured to:
collect user input data from each of a plurality of users, wherein the user input data is indicative of one or more skills for providing vehicle towing services;
receive driving behavior data associated with each of the plurality of users;
build a model indicative of an expected location of each of the plurality of users over a period of time based on the user input data and the driving behavior data of each of the plurality of users over the period of time;
receive a request for a vehicle towing service associated with a vehicle from a computing device;
identify one user for performing the vehicle towing service based on the model, wherein the one user is expected to be located within a threshold distance of the vehicle during a portion of the period of time;
send a notification to an additional computing device, wherein the notification is configured to request a confirmation that the one user agrees to perform the vehicle towing service;
send a location of the vehicle to the additional computing device; and
transfer a digital key to the additional computing device, wherein the digital key is configured to access the vehicle.

2. The system of claim 1, comprising a plurality of vehicle systems on a plurality of vehicles of the plurality of users, wherein the plurality of vehicle systems is configured to monitor the driving behavior data comprising respective location data of each of the plurality of vehicles, a respective time period of user of each of the plurality of vehicles, respective times at which each of the plurality of vehicles is being used by each of the plurality of users, one or more respective routes driven by each of the plurality of vehicles, or a combination thereof.

3. The system of claim 1, wherein the user input data and the driving behavior data are re-organized or re-formatted into a unified data format or a data structure.

4. The system of claim 3, wherein the user input data and the driving behavior data are stored in one or more digital ledgers.

5. The system of claim 1, wherein the digital key is configured to open a mechanical lock box secured to the vehicle.

6. The system of claim 5, wherein the mechanical lock box comprises an actuator configured to open and close a mechanical lock feature of the mechanical lock box.

7. The system of claim 1, wherein the processor is configured to send an additional notification to a third computing device, wherein the additional notification requests that a mobile key making device configured to make a replacement key is transported to the location.

8. The system of claim 7, wherein the mobile key making device comprises a key cutting drone.

9. A method, comprising:
collecting user input data from each of a plurality of users, wherein the user input data is indicative of one or more skills for providing vehicle towing services;
receiving driving behavior data associated with each of the plurality of users;
building a model indicative of an expected location of each of the plurality of users over a period of time based on the user input data and the driving behavior data of each of the plurality of users over the period of time;
receiving a request for a vehicle towing service associated with a vehicle from a computing device;
identifying one user for performing the vehicle towing service based on the model, wherein the one user is expected to be located within a threshold distance of the vehicle during a portion of the period of time;
sending a notification to an additional computing device, wherein the notification is configured to request a confirmation that the one user agrees to perform the vehicle towing service;
sending a location of the vehicle to the additional computing device; and
transferring a digital key to the additional computing device, wherein the digital key is configured to access the vehicle.

10. The method of claim 9, wherein the user input data comprises respective vehicle towing ranges or vehicle types for towing for each of the plurality of users.

11. The method of claim 9, wherein the user input data is received via a crowdsourcing microsite.

12. The method of claim 9, wherein the driving behavior data is acquired by a plurality of sensors disposed in a plurality of vehicles associated with the plurality of users.

13. The method of claim 12, wherein the plurality of sensors comprises one or more cameras, one or more location sensors, one or more infrared sensors, one or more pressure sensors, one or more weight sensors, or any combination thereof.

14. The method of claim 9, wherein the digital key is configured to activate a Bluetooth device configured to unlock the vehicle.

15. The method of claim 9, wherein transferring the digital key comprises:
verifying an identification of the one user based on a comparison between identification information of the one user received from a database and identification data received from the additional computing device.

16. The method of claim 15, wherein the identification information of the one user comprises a name, a date of birth, a driver license number, an employer name, an employment identification number, biometric data, or a combination thereof.

17. A non-transitory computer-readable medium comprising computer-executable instructions that, when executed, are configured to cause a processor to perform operations comprising:
collecting user input data from each of a plurality of users, wherein the user input data is indicative of one or more skills for providing vehicle towing services;
receiving driving behavior data associated with each of the plurality of users;
building a model indicative of an expected location of each of the plurality of users over a period of time based on the user input data and the driving behavior data of each of the plurality of users over the period of time;
receiving a request for a vehicle towing service associated with a vehicle from a computing device;
identifying a user for performing the vehicle towing service based on the model, wherein the one user is expected to be located within a threshold distance of the vehicle during a portion of the period of time;
sending a notification to an additional computing device, wherein the notification is configured to request a confirmation that the user agrees to perform the vehicle towing service;
sending a location of the vehicle to the additional computing device; and
transferring a digital key to the additional computing device, wherein the digital key is configured to access the vehicle.

18. The non-transitory computer-readable medium of claim 17, wherein the operations comprise:
identifying a set of users of the plurality of users based on a query of one or more databases configured to store the user input data, the driving behavior data, and the model; and
identifying the user of the set of users based on a predicted schedule of the user and a time associated with the request.

19. The non-transitory computer-readable medium of claim 17, wherein the user input data comprises historical vehicle towing service records associated with each of the plurality of users.

20. The non-transitory computer-readable medium of claim 17, wherein transferring the digital key to the additional computing device comprises:
sending a notification to a vehicle system of the vehicle when the additional computing device is within a threshold distance of the location, wherein the vehicle system is configured to send a machine-readable image to the additional computing device, wherein the machine-readable image is configured to provide access to the vehicle.

\* \* \* \* \*